Fig.1ᵇ

Inventor
Caleb Davies Jr.
By Fay, Oberlin & Fay
Attorneys

Patented May 14, 1929.

1,712,983

UNITED STATES PATENT OFFICE.

CALEB DAVIES, JR., OF POLAND, OHIO.

METHOD OF MAKING WATER GAS.

Application filed March 18, 1922. Serial No. 544,938.

The present improvements relate more particularly to an arrangement of apparatus and method of operation thereof whereby so-called "blue" water gas may be made at unusually high thermal efficiency and with resultant high yield of good gas per ton fuel. The general procedure involved in the manufacture of water gas is of course well understood, and attention herein need accordingly be directed only to the novel features which include the combination, with the water gas generator proper, of a plurality of regenerators suitably connected with such generator so that an increased quantity of fuel may be reduced by the regeneration of heat from the water gas. The arrangement of the parts of the apparatus furthermore is such as to make it possible to reverse the blow as well as the run, which contributes to the thermal efficiency of the plant because when the exit gases at both ends are equal in temperature the latter is at a minimum.

To the accomplishment of the foregoing and related ends, said invention, then, consists of the means and steps hereinafter fully described and particularly pointed out in the claims; the annexed drawing and the following description setting forth in detail certain means and one mode of carrying out the invention, such disclosed means and mode illustrating, however, but one of various ways in which the principle of the invention may be used.

In said annexed drawing:—

Figure 1:
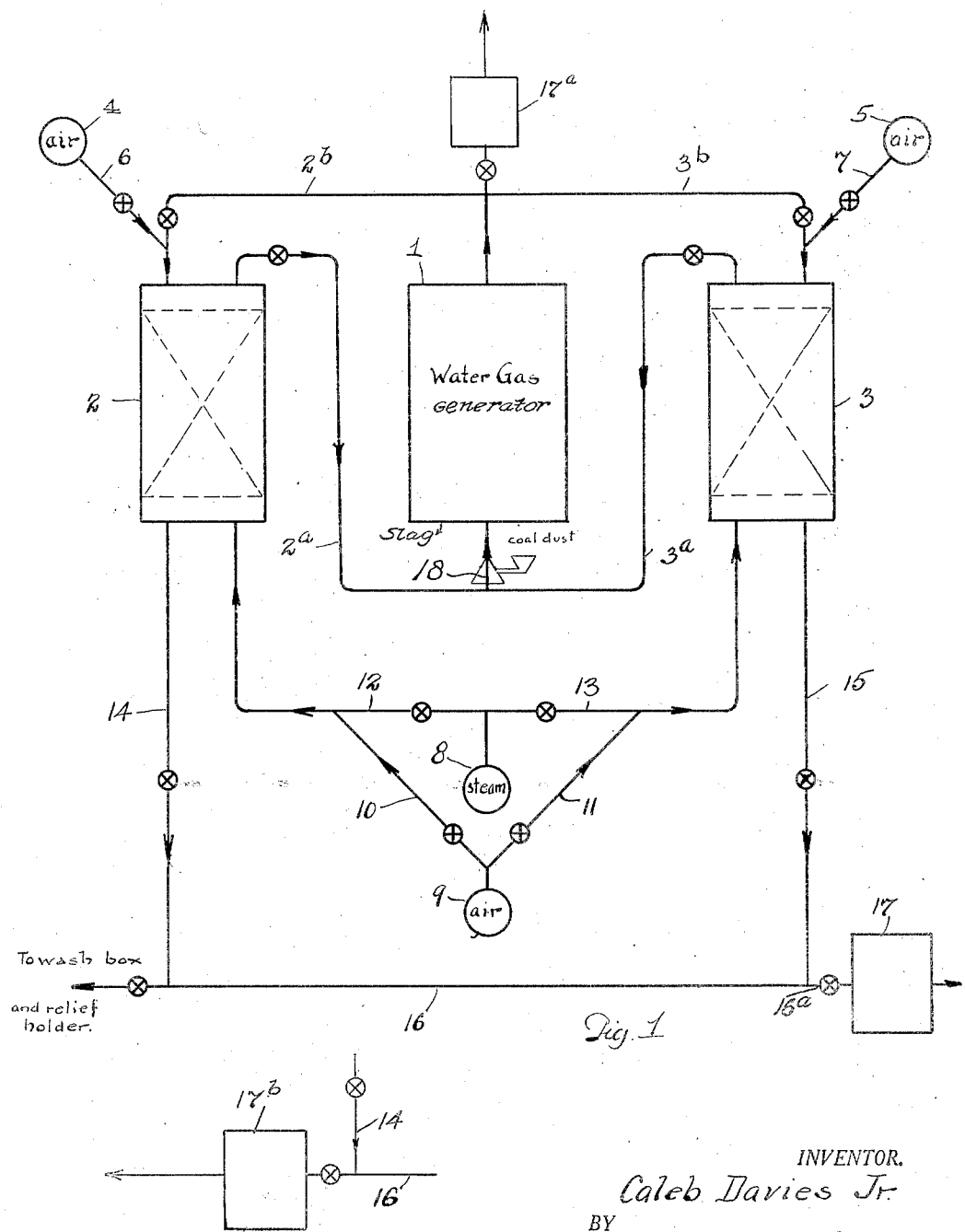
Figure 2:
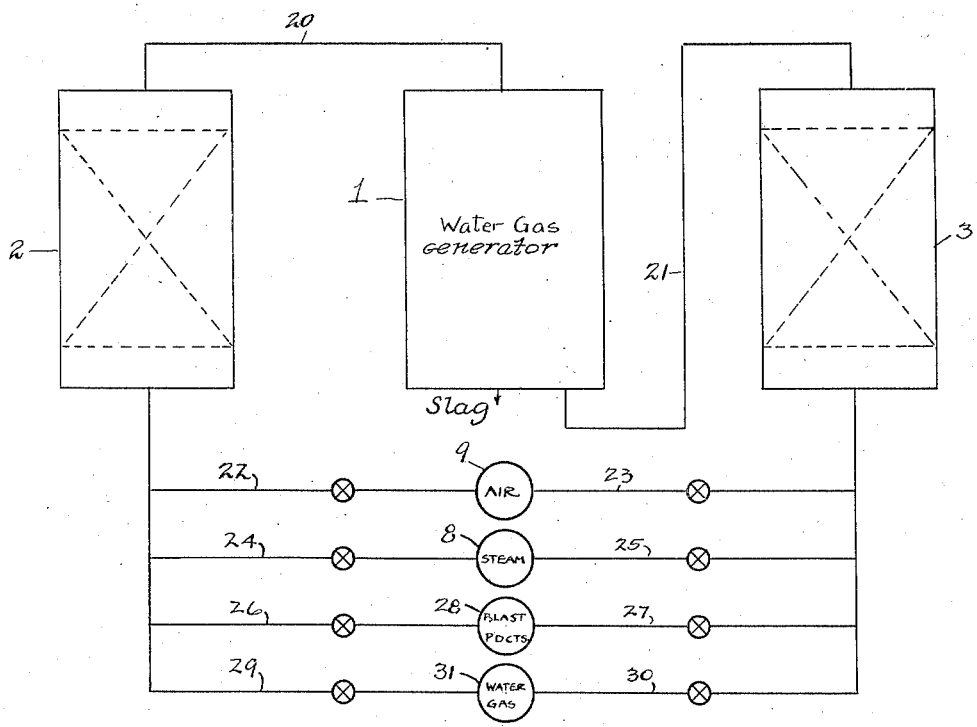
Figure 3:
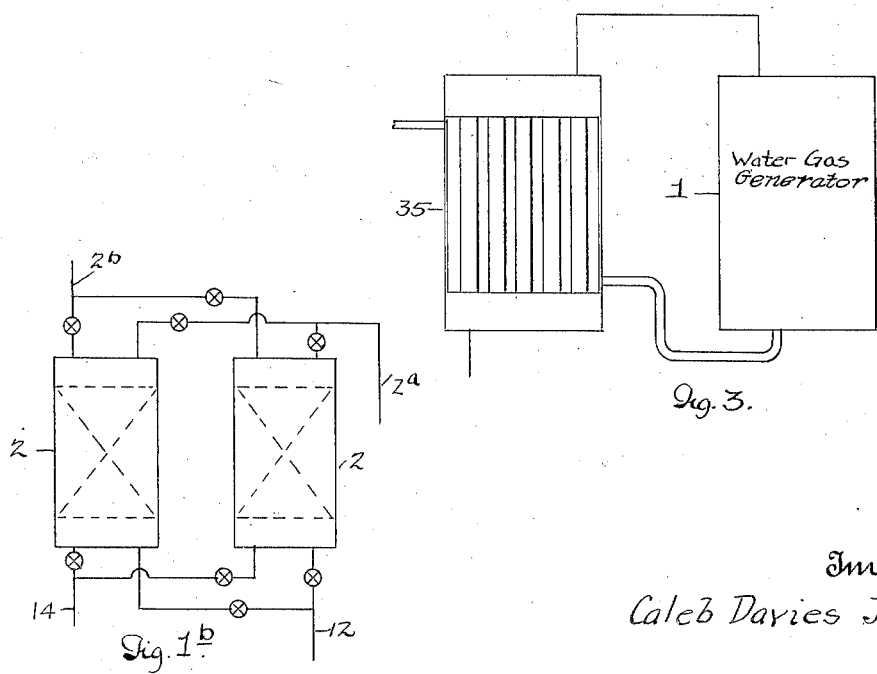

Fig. 1 is a diagrammatic representation, on the order of a flow sheet, of an apparatus or plant for making water gas in accordance with my invention; Figs. 1ª and 1ᵇ are diagrammatic representations showing modified details of such apparatus; Fig. 2 is a similar diagrammatic representation of a modified form of apparatus; and Fig. 3 diagrammatically illustrates still another detail modification.

Referring first of all to Fig. 1, as already indicated, the central features of the apparatus are the water-gas generator 1, which is preferably of the slagging type similar to an iron cupola, and two similar regenerators in the form of checker-work towers 2 and 3 preferably symmetrically arranged with respect to said generator 1. Leading to the bottom of said water-gas generator 1, from the tops of regenerators 2 and 3 respectively, are valve controlled brick-lined insulated pipes 2ª and 3ª; while two similar pipes 2ᵇ and 3ᵇ lead from the top of said generator to the tops of the respective chambers 2 and 3. Auxiliary air from supply pipes 4 and 5 may be introduced into said last-mentioned pipes 2ᵇ and 3ᵇ and the regenerators 2 and 3 through suitable valve-controlled connections 6 and 7 when found desirable.

Steam and the main supply of air are supplied to the respective regenerators 2 and 3 from a steam main 8 and an air main 9, from which branched valve-controlled connections 10, 11, for the air, and 12, 13, for the steam, lead to the bottom of regenerator 2 and the bottom of regenerator 3, respectively. It will be understood that the steam and air thus supplied from mains 8 and 9 will be under suitable pressure, particularly the air, so that an air blast is produced through the checker work in the regenerators 2 or 3 as the case may be when connection is had with said main 9. The auxiliary air supplied from mains 4 and 5 may be hot if desired. The steam supplied from main 8 will preferably be superheated low-pressure steam.

For removing the products of combustion or gas, as the case may be, from the regenerators 2 and 3, valve-controlled pipes 14 and 15 lead from the bottom portions thereof, respectively, to a common line 16, one end of which, (the left-hand end as shown) in turn leads to a wash box and relief holder, connection with the latter being controlled by a suitable valve; while the other end leads, through a valve connection 16ª, to a coke preheater 17 and thence to a stack or induced draft fan (not shown), as desired. The coke preheater will preferably be a rotary cylinder drier of the counter-flow type.

The preferred operation of the aforesaid apparatus is carried out in repeating cycles of four periods each, as will now be described in detail, viz—

(1) The air blast from main 9 is connected with checker chamber or regenerator 2, which is assumed to have been heated by blast gases previously, and passes upwardly therethrough so as to be heated, and thence proceeds through pipe 2ª to the bottom of water gas generator 1 to blast the fuel bed to incandescence. From the generator the blast gases pass through pipe 3ᵇ to the top of checker chamber or regenerator 3, auxiliary air being admitted from supply line 5 through connection 7 in order to burn any carbon monoxide that may be present and the checker mass is heated very effectively, ready for its turn in the cycle. The products of combustion pass downwardly through said checker chamber or regenerator 3 and are thence conducted by pipes 15 and 16 through the coke preheater 17 where the solid fuel to be next used in the generator is preheated, and thence the said combustion products pass on to the stack or induced draft fan.

(2) The air blast being turned off, steam from main 8 is next supplied to checker chamber or regenerator 3, passing thence through pipe 3ª to the bottom of the water-gas generator 1 and making water-gas in accordance with the well-known reaction, as it passes upwardly through the latter. The hot water gas from the top of the generator 1 passes through pipe 2ᵇ to the top of the other checker chamber or regenerator 2, downwardly through the latter, and thence by way of pipes 14 and 16 to the wash box and relief holder.

(3) The operation during this period is the same as during period (1), but with the checker chambers or regenerators interchanged.

(4) The operation during this period is the same as during period (2), but with the checker chambers or regenerators interchanged.

The operation in the second period of the cycle just described may be changed, if desired, by supplying steam from main 8 to checker chamber or regenerator 2 instead of 3, thence through pipe 2ª to the bottom of the water-gas generator. From the top of the latter, the hot gas passes through pipe 3ᵇ to the top of checker chamber or regenerator 3, downwardly through the latter and thence by way of pipes 15 and 16 to the wash box and relief holder. The operation during period (4) will, of course, be the same as that just described, but with the checker chambers or regenerators interchanged.

As previously explained, the water-gas generator is preferably of the slagging type, and in that case a suitable flux is charged with the fuel. Where some other fuel is used instead of coke, because of relative cheapness or for other reasons, such fuel will of course be handled in a fashion suited to its character. Moreover, if desired, powdered coal may be utilized for preliminarily heating the bed of fuel in the generator, being introduced into the air blast immediately before, or as the air enters the water-gas generator, as shown at 18, in Fig. 1.

As shown in the upper portion of Fig. 1, a preheater 17ª for the fuel may be connected to receive a small quantity of the blast gases or hot water gas directly from the generator 1, before such gases pass into regenerator 2 or 3; and as shown in Fig. 1ª, the water-gas on its way to the relief holder may be utilized in another similar preheater 17ᵇ.

Instead of a single checker chamber or regenerator 2 and another single checker chamber or regenerator 3, as hereinbefore described, I may substitute a pair of such checker chambers for each of the foregoing, (see Fig. 1ᵇ), one unit within each such pair being in use during run periods (2) and (4) and idle during blow periods (1) and (3). The other unit in each pair would then be in use during blow periods and idle during run periods, thus avoiding danger of explosion, which may exist where single chambers are employed, as in the illustrated arrangement, in case of careless operation. In other words, where such single chambers are employed the water gas in either chamber at the end of the first run period should not be followed with too much excess air in the products of combustion entering the same chamber at the beginning of the following blow periods. In this way I avoid necessity of purging and explosion danger due to valve leakage.

Instead of using first one, then the other, of two regenerators interconnected with the water-gas generator and the steam and air supplies, as in the plan shown in Fig. 1, I may interconnect such generator 1 with regenerators 2 and 3 by means of ducts 20 and 21 so that they may be reversibly operated in series, as shown in Fig. 2. The lower ends of the regenerators will then be respectively connected through ducts 22, 23, with the air supply line 9, through ducts 24, 25, with the steam supply line 8, through ducts 26, 27, with a line 28, through which the blast products are designed to be discharged, and through ducts 29, 30, with a similar line 31, through which the water gas is designed to be discharged, such lines 28 and 31 taking the place of the common line 16 and the alternative connections therewith, shown in Fig. 1. The several pairs of ducts thus connecting the lower ends of the regenerators with the lines 9, 8, 28 and 31 are all valve-controlled, and by proper manipulation thereof the following cycle of periods will be secured, such operations corresponding with the four periods in the cyclic operation of the previously described apparatus, viz, the valves in ducts 22 and 27 being opened and the other valves closed air is forced through renegerator 2, thence through the water gas generator and through regenerator 3, and is discharged into the blast product line 28. Next the valves in lines 25 and 29 are opened, all the other valves being closed, and as a result steam is supplied to the water-gas generator through regenerator 3 heated in the previous period of operation by the passage of the blast products therethrough, and the resulting water gas from the generator 1 thence passes through the regenerator 2 and into the water-gas main 31. In the third period the valves in lines 23 and 26 are opened, the other valves being closed, with the result that the same operation occurs as in the first period, except the flow through the regenerators and the water-gas generator is in the reverse direction. Finally the valves in ducts 24 and 30 are opened, the other valves being closed, with the result that the operation in the second period, described above, is repeated, but with the parts of the apparatus similarly connected up in reverse order.

While I have heretofore referred to regenerators as being used in connection with the water-gas generator to recover the heat that would otherwise go to waste, it will be understood that recuperators may be utilized instead of such regenerators as a means for effecting the exchange of heat. Such a recuperator 35 is shown in diagrammatic form in Fig. 3 as connected with the water-gas generator 1 in place of the regenerators 2 and 3 illustrated in Figs. 1 and 2.

By means of either of the foregoing arrangements of apparatus, I am enabled readily to heat the air to a temperature above 500 degrees F. before passing it into the water-gas generator and the steam to an equally high temperature, this preliminary heating of the incoming gas-forming material being accomplished by means of heat obtained from outgoing gaseous products of a preceding step of the process. The economy in operation thus effected will be readily apparent. At the same time an economy of equal importance is effected by preliminarily heating the solid fuel that is used in the water-gas generator by passing the blast gases from the latter through a fuel preheater where such gases or other products of combustion from the generator give up heat to such solid fuel.

Other modes of applying the principle of my invention may be employed instead of the one explained, change being made as regards the means and the steps herein disclosed, provided those stated by any of the following claims or their equivalents be employed.

I therefore particularly point out and distinctly claim as my invention:—

1. In a method of making water-gas, the steps which consist in blasting the fuel bed of a water-gas generator with air supplied through a highly heated heat-transfer chamber, discharging the blast-gas to heat a second heat-transfer chamber and supplying air thereto for combustion, then passing steam through the second heat-transfer chamber and to the fuel-bed of the generator, whereby the ash of the latter is maintained at a temperature for slagging conditions, discharging the hot water-gas from the generator through the first-mentioned heat-transfer chamber, and then blasting the fuel-bed of the generator with air supplied therethrough and passing the hot products thence through fuel for the generator.

2. In a method of making water-gas, the steps which consist in blasting the fuel-bed of a water-gas generator with air supplied through a highly heated heat-transfer chamber, discharging the blast-gas to heat a second heat-transfer chamber and supplying air thereto for combustion, then passing steam through the second heat-transfer chamber and to the fuel-bed of the generator, whereby the ash of the latter is maintained at a temperature for slagging conditions, discharging the hot water-gas from the generator through the first-mentioned heat transfer chamber, and then blasting the fuel-bed of the generator with air, and initially heating fuel for the generator by hot blast-gases and by hot water-gas.

Signed by me this 16th day of March, 1922.

CALEB DAVIES, Jr.